Patented Dec. 27, 1949

2,492,373

UNITED STATES PATENT OFFICE 2,492,373

IMIDAZOLONE PREPARATION

John L. Wood, Woodside, and Vincent du Vigneaud, Scarsdale, N. Y., assignors to the People of the United States No Drawing. Application January 25, 1946, Serial No. 643,490

5 Claims. (Cl. 260—309)

The present invention is dedicated by the inventors to the public of the United States and each and every member thereof, and is held for the benefit of, and to be enjoyed by, said members of the public.

This invention relates to new organic compounds, to a process of preparing the same and to a process of converting the new products into useful organic substances.

The compounds of the present invention may be represented by the following formula

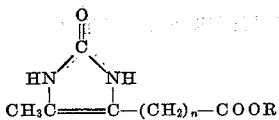

in which $n$ is a small, whole number and R is an alkyl radical. These products are of particular value as intermediates in the preparation of other useful organic compounds. For example, when $n$ is 5 and R is hydrogen, reduction with Raney nickel yields desthiobiotin, a compound which has been found to be as effective as biotin in supporting the growth of yeast. Homologues of desthiobiotin are obtained when $n$ is some other integer.

The process by which the compounds of the present invention are made may be illustrated by the following equation in which zeta-amino-eta-keto-pelargonic acid is reacted with cyanic acid to yield epsilon-(4-methyl-5-imidazolone-2)-caproic acid:

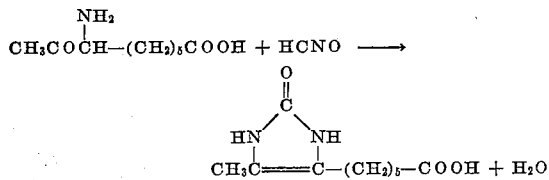

For purposes of convenience it is preferred to use an alkali metal salt of the cyanic acid and an acid salt of the amino keto carboxylic acid, such as the hydrochloride.

As will be apparent, other keto-fatty acids having an amino group on the carbon atom adjacent to the keto group may also be employed in the reaction to obtain compounds having an imidazolone ring and side chains of varying length. Esters of these acids with alcohols such as ethyl, butyl, etc. may also be used in the reaction and, obviously, the final product will be an ester of the 5-imidazolone-2 fatty acid. In such case R in the general formula represents the ester-forming radical.

To illustrate the invention in greater detail an example of the preparation of the preferred product of the invention from known starting materials will be given.

A suspension of 7.6 g. of alpha-aminosuberic acid in 50 cc. of acetic anhydride and 40 cc. of pyridine was heated in a water-bath at 80-90° for four hours. The solvent was distilled in vacuo at 50°. Water was added to the residue and then distilled out at reduced pressure. The process was repeated. Sixty cc. of 2 N hydrochloric acid was added and the solution was heated under reflux for four hours. The resultant solution was treated with Norite and then concentrated to dryness under nitrogen in vacuo at 40°. The residue was taken up in 20 cc. of water. About 3-5 g. of solid sodium acetate was added and followed by saturated sodium carbonate until the pH was 4.5-5.

The solution was cooled in an ice-bath and 5 g. of potassium cyanate in 15 cc. of water was added. The pH was adjusted to 6-6.5 with 5 N sodium hydroxide. It was warmed to 40° and allowed to stand one-half to one hour at room temperature. The solution was then adjusted to pH 4 by the addition of dilute hydrochloric acid and cooled in an ice-bath. The product separated as a thick mass which was filtered and washed with ice water. The pressed precipitate was dissolved immediately in a minimum of hot absolute alcohol and poured into about 10 volumes of water. After cooling in the refrigerator, it was filtered and dried in vacuo over phosphorus pentoxide at room temperature.

The product, epsilon-(4-methyl-5-imidazolone-2)-caproic acid, was hygroscopic and had some color. It melted at 168° with decomposition. The product gave a characteristic purple-colored solid when treated with bromine in carbon tetrachloride.

The methyl ester of this acid was prepared by heating the acid with methanol and anhydrous hydrogen chloride to boiling and allowing to stand for three hours. The alcoholic hydrogen chloride was evaporated to an oil which was dissolved in ethyl acetate. Chloroform was then added and the resulting solution was washed with an aqueous solution of sodium bicarbonate. The organic layer was washed with water and then evaporated to yield the crystalline ester.

This product was later reduced by treatment with hydrogen and a catalyst, nickel on kieselguhr, to yield the methyl ester of desthiobiotin.

To prepare desthiobiotin, epsilon-(4-methyl-5-imidazolidone-2)-caproic acid, from epsilon-(4- methyl-5-imidazolone-2)-caproic acid a 5% sodium bicarbonate solution was added to 10 g. of the imidazolone until a pH of 7.5 was attained. the solution was filtered and diluted to 120 cc. with water. Approximately 10 cc. of Raney nickel catalyst was added. The mixture was placed in a 300 cc. bomb and shaken at 2300 pounds pressure and 100° for thirty-six hours. The solution was filtered from the catalyst and the pH (11.3) was reduced to 8.5 with 10 N sulfuric acid. The product separated as colorless crystals. These were washed with ice water and dried in a desiccator over phosphorus pentoxide (weight 6.3 g., melting point 136–137°). On cooling, the mother liquor deposited 1.2 g. of rosettes, melting point 135–139°. On concentration of the mother liquor a further crop of 0.78 g., melting point 130–136°, was isolated. The analyses indicated desthiobiotin had been formed by the reduction.

What I claim is:

1. A method of preparing compounds having the formula

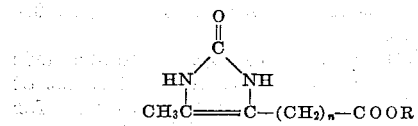

in which $n$ is a small whole number not less than one and R is a member of the group consisting of hydrogen and alkyl radicals which comprises reacting a compound from the group consisting of cyanic acid and its alkali metal salts with a member of the group consisting of keto-fatty acids having an amino group on the carbon atom adjacent to the keto group and alkyl esters thereof and the hydrochlorides of such acids and esters.

2. A method of preparing epsilon-(4-methyl-5-imidazolone-2)-caproic acid which comprises reacting cyanic acid with zeta-amino-eta-keto-pelargonic acid.

3. A method of preparing epsilon-(4-methyl-5-imidazolone-2)-caproic acid which comprises reacting potassium cyanate with zeta-amino-eta-keto-pelargonic acid hydrochloride.

4. A method of preparing epsilon-(4-methyl-5-imidazolidone-2)-caproic acid which comprises the step of reducing epsilon-(4-methyl-5-imidazolone-2)-caproic acid by means of Raney nickel and hydrogen gas under high pressure.

5. A method of preparing epsilon-(4-methyl-5-imidazolidone-2)-caproic acid which comprises the steps of reacting potassium cyanate with zeta-amino-eta-keto-pelargonic acid hydrochloride and reducing the resulting product by treatment with Raney nickel and hydrogen gas, under high pressure.

JOHN L. WOOD.
VINCENT DU VIGNEAUD.

REFERENCES CITED

The following references are of record in the file of this patent:

UNITED STATES PATENTS

| Number | Name | Date |
|---|---|---|
| 2,397,250 | Duschinsky | Mar. 26, 1946 |

OTHER REFERENCES

Burquin et al., Helvitica Chim. Acta., vol. 28 (1945), pages 528–532.